United States Patent
Niemelä et al.

(10) Patent No.: US 7,193,988 B2
(45) Date of Patent: Mar. 20, 2007

(54) ALLOCATING ABIS INTERFACE TRANSMISSION CHANNELS IN PACKET CELLULAR RADIO NETWORK

(75) Inventors: Kari Niemelä, Oulu (FI); Arto Kangas, Espoo (FI); Leif Friman, Järvenpää (FI); Pasi Ylinen, Vantaa (FI); Harri Helminen, Nurmijärvi (FI)

(73) Assignee: Nokia Networks Oy, Espoo (FI)

( * ) Notice: Subject to any disclaimer, the term of this patent is extended or adjusted under 35 U.S.C. 154(b) by 926 days.

(21) Appl. No.: 09/866,577

(22) Filed: May 29, 2001

(65) Prior Publication Data

US 2002/0003783 A1    Jan. 10, 2002

Related U.S. Application Data

(63) Continuation of application No. PCT/FI00/00823, filed on Sep. 27, 2000.

(30) Foreign Application Priority Data

Sep. 28, 1999    (FI) .................................. 19992072

(51) Int. Cl.
  *H04B 7/212*    (2006.01)
  *H04J 3/16*     (2006.01)
(52) U.S. Cl. ....................... 370/347; 370/465
(58) Field of Classification Search ...................... None
  See application file for complete search history.

(56) References Cited

U.S. PATENT DOCUMENTS 5,590,400 A * 12/1996 Lopponen ................... 455/509
5,729,541 A *  3/1998 Hamalainen et al. ....... 370/337
5,953,668 A *  9/1999 Reilly ......................... 455/442
5,978,368 A * 11/1999 Hjelm et al. ................ 370/347
5,991,716 A * 11/1999 Lehtimaki ................... 704/212
6,070,089 A *  5/2000 Brophy et al. .............. 455/560
6,085,089 A *  7/2000 Emmer et al. .............. 455/439
6,262,994 B1* 7/2001 Dirschedl et al. ........... 370/465
6,330,288 B1* 12/2001 Budka et al. ................ 375/296
6,334,057 B1* 12/2001 Malmgren et al. .......... 455/450
6,363,425 B1*  3/2002 Hook et al. ................. 709/226
6,529,497 B1*  3/2003 Hjelm et al. ................ 370/347
6,577,641 B1*  6/2003 Izumi .......................... 370/442
6,611,855 B1*  8/2003 Hellberg et al. ............ 708/420

FOREIGN PATENT DOCUMENTS

| EP | 858 235     | 8/1998 |
| WO | WO 94/00959 | 1/1994 |
| WO | WO 99/11032 | 3/1999 |
| WO | WO 99/35870 | 7/1999 |

* cited by examiner

*Primary Examiner*—Andrew C. Lee
(74) *Attorney, Agent, or Firm*—Pillsbury Winthrop Shaw Pittman LLP (57) ABSTRACT

The invention relates to a method of allocating Abis interface transmission channels in a packet cellular radio network, and to a network part utilizing the method. The method comprises (502) allocating fixedly a certain number of transmission channels to base-station-specific operations and maintenance signalling and to transceiver-specific telecommunication signalling; and (504) allocating dynamically, using in-band signalling, a necessary number of transmission channels to packet data transfer, the amount of packet data varying according to the modulation and coding scheme used on a Um interface.

16 Claims, 7 Drawing Sheets

| SLAVE | TS | SUB TS |
|---|---|---|
| 1 | 27 | 1 |
| 2 | 28 | 3 |
| 3 | 30 | 1 |

Fig 4A

SUB TS

|  | 0 | 1 | 2 | 3 |
|---|---|---|---|---|
| 0 |  |  |  |  |
| 1 |  | M |  |  |
| 2 |  |  |  |  |
| 3 |  |  |  |  |
| 4 |  |  |  |  |
| 5 |  |  |  |  |
| 6 |  |  |  |  |
| 7 |  |  |  |  |
| 8 |  |  |  |  |
| 9 |  |  |  |  |
| 10 |  |  |  |  |
| 11 |  |  |  |  |
| 12 |  |  |  |  |
| 13 |  |  |  |  |
| 14 |  |  |  |  |
| 15 |  |  |  |  |
| 16 |  |  |  |  |
| 17 |  |  |  |  |
| 18 |  |  |  |  |
| 19 |  |  |  |  |
| 20 |  |  |  |  |
| 21 |  |  |  |  |
| 22 |  |  |  |  |
| 23 |  |  |  |  |
| 24 |  |  |  |  |
| 25 |  |  |  |  |
| 26 |  |  |  |  |
| 27 |  | S |  |  |
| 28 |  |  |  | S |
| 29 |  |  |  |  |
| 30 |  | S |  |  |
| 31 |  |  |  |  |

ALLOCATING ABIS INTERFACE TRANSMISSION CHANNELS IN PACKET CELLULAR RADIO NETWORK

This is a Continuation of International Application No. PCT/FI00/00823 filed Sep. 27, 2000 which designated the U.S. and was filed in the English language.

FIELD OF THE INVENTION

The invention relates to a method of allocating Abis interface transmission channels in a packet cellular radio network, and to a network part of a packet cellular radio network utilizing the method.

BACKGROUND OF THE INVENTION

In addition to circuit-switched speech and data, an increasing need exists in cellular radio networks to transfer packet-switched data, wherein user data is transferred as packets. New solutions have been developed to enable the existing cellular radio networks to be changed so as to enable packet transfer to take place as cost-efficiently and effectively as possible.

GPRS (General Packet Radio Service) is a GSM-based service wherein capacity free from air interface circuit switching is used for packet transfer. In basic GPRS, GMSK (Gaussian Minimum-Shift Keying) is used as a modulation method.

EGPRS (Enhanced GPRS) uses EDGE (Enhanced Data Rates for GSM Evolution) technique for increasing data transmission capacity. In addition to the GMSK modulation normally used in the GSM, 8-PSK (8-Phase Shift Keying) modulation is also used. The aim is to provide real-time services using packet switching for transferring speech and video image, for example. In principle, the data transmission capacity may vary from few kilo-bits per second up to 400 kbit/s.

Other methods are also used to increase capacity, including incremental redundancy, blind detection of modulation and link adaptation.

In incremental redundancy, a receiver is equipped with memory in which the bits of erroneously received radio blocks are stored. The retransmitted radio blocks are then combined with the stored radio blocks, which enables the radio block to be decoded. An example of such a protocol is type 11 hybrid ARQ (Automatic Repeat Request).

Blind detection of modulation means that it is unnecessary to signal to the receiver which modulation method is used but the receiver detects it while receiving the signal.

Link adaptation refers to changing modulation and channel coding based on measurements carried out in the channel. The aim is to optimize. the use of the radio resource, taking temporary variations in the conditions of the radio interface into account. The aim is to optimize throughput of user data and minimize delays. For example, coding can be reduced under desirable conditions, which means that a larger amount of user payload can be transferred. Similarly, one modulation method may be more suitable than the other for certain conditions on the radio interface. Different combinations of modulation and channel coding may be called MCS (Modulation and Coding Schemes). The radio interface is also called an air interface or Um interface.

However, data transfer on an Abis interface between a base station and a base station controller remains a bottleneck. According to the prior art, a certain number of transmission channels is allocated fixedly to base-station-specific operations and maintenance signalling. Similarly, a certain number of transmission channels is allocated fixedly to transceiver-specific telecommunication signalling. The telecommunication signalling herein refers specifically to signalling concerning Um interface connections, such as connection establishment, handover and measurement reports.

The MCS selected greatly affects the amount of packet data transferred on the Um interface. Consequently, the amount of packet data transferred on the Abis interface may vary greatly.

The current solution is to allocate the user-specific Abis interface capacity to packet data according to the MCS which requires the highest capacity. In EGPRS, for example, a channel providing at least 64 kbit/s is then allocated fixedly. A problem presenting itself is that when an MCS necessitating a low data transmission capacity is used, Abis interface transmission capacity is being wasted since it is dimensioned according to the highest transfer need.

BRIEF DESCRIPTION OF THE INVENTION

An object of the invention is thus to provide a method and an apparatus implementing the method so as to enable the above-mentioned problems to be alleviated. This is achieved by a method which will be disclosed in the following. The method is a method of allocating Abis interface transmission channels in a packet cellular radio network, comprising: allocating fixedly a certain number of transmission channels to base-station-specific operations and maintenance signalling and to transceiver-specific telecommunication signalling. The method comprises allocating dynamically, using in-band. signalling, a necessary number of transmission channels to packet data transfer, the amount of packet data varying according to the modulation and coding scheme used on a Um interface.

The invention further relates to a network part of a packet cellular radio network comprising: a base station; a transceiver implementing a Um interface at the base station; a channel codec unit at the base station; a packet control unit communicating with the channel codec unit through an Abis interface; means for allocating fixedly on the Abis interface a certain number of transmission channels to base-station-specific operations and maintenance signalling and to transceiver-specific telecommunication signalling. The packet control unit, using in-band signalling, dynamically allocates on the Abis interface a necessary number of transmission channels to packet data transfer, the amount of packet data varying according to the modulation and coding scheme used on the Um interface.

Preferred embodiments of the invention are disclosed in the dependent claims.

The idea underlying the invention is that the transmission channels used for transferring packet data are allocated dynamically as necessary. This is feasible since in-band signalling is used, which is a fast signalling method compared to using a separate signalling channel.

Several advantages are achieved by the method and system of the invention. The greatest advantage is that Abis interface transmission need is satisfied according to the situation, i.e. less transmission capacity will be necessary, which saves the building and operating costs of the Abis interface transmission links. In addition, the frame types and in-band signalling used can be implemented by mainly utilizing existing structures, which makes the invention easier to implement.

BRIEF DESCRIPTION OF THE DRAWINGS

The invention is now described in closer detail in connection with the preferred embodiments and with reference to the accompanying drawings, in which.

DESCRIPTION OF EMBODIMENTS

Figure 1A:
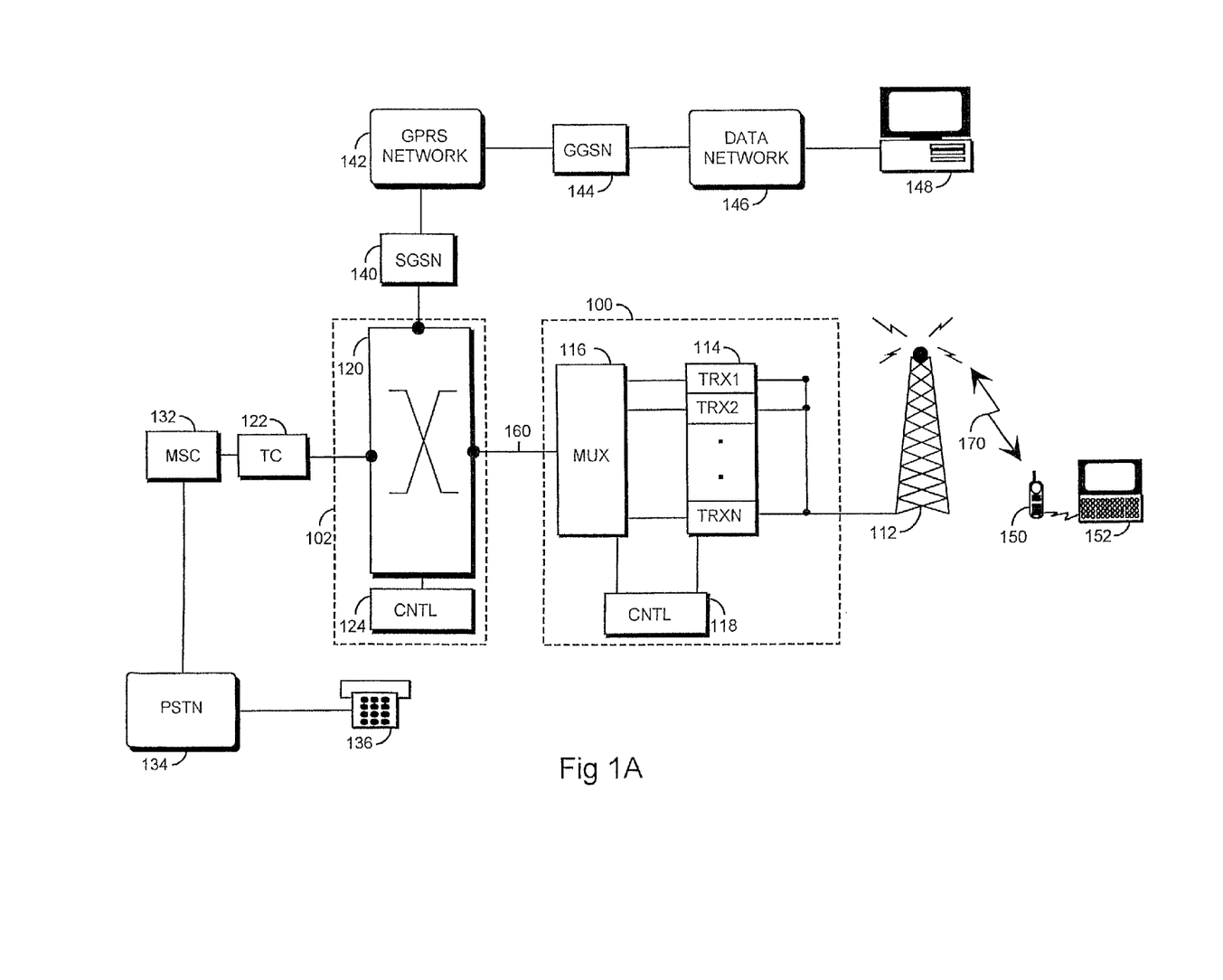
FIG. 1A is a block diagram of a cellular radio network.

Referring to FIG. 1A, a typical structure of a cellular radio network of the invention and its connections to a fixed telephone network and a packet transmission network will be described. FIG. 1A only includes essential blocks for describing the invention, but it will be obvious to one skilled in the art that a common packet cellular radio network also includes other functions and structures that need not be described in closer detail here. The invention is most preferably used in the GSM system 2+ phase packet transfer, i.e. GPRS, and its enhanced form, i.e. EGPRS.

A cellular radio network typically comprises the infrastructure of a fixed network, i.e. a network part and subscriber terminals 150, which can be located fixedly, located in a vehicle or portable terminals to be carried around, for example. The network part comprises base stations 100. Communicating with the several base stations 100, a base station controller 102, in turn, controls the base stations in a centralized manner. The base station 100 comprises transceivers 114. A base station 100 typically comprises one to sixteen transceivers 114. One transceiver 114 provides one TDMA (Time Division Multiple Access) frame, i.e. typically eight time slots, with radio capacity.

The base station 100 comprises a control unit 118 controlling the operation of the transceivers 114 and a multiplexer 116. The multiplexer 116 places the traffic channels and the controlling channels used by the plurality of transceivers 114 over one transmission link 160. The structure of the transmission link 160 is clearly defined and it is called an Abis interface. The transmission link 160 is typically implemented by using a 2 kbit/s connection, i.e. a PCM (Pulse Code Modulation) link, which provides a 30×64 kbit/s transmission capacity, time slots 0 and 31 being reserved for synchronization.

The transceivers 114 of the base station 100 communicate with an antenna unit 112 implementing a duplex radio connection 170 to the subscriber terminal 150. Also in the duplex radio connection 170, the structure of the frames to be transmitted is defined in detail, and it is called an air interface.

The subscriber terminal 150 may be a common mobile telephone, for example, to which a portable computer 152 can be connected by an extension card, which portable computer can be used in ordering and processing packets.

The base station controller 102 comprises a switching field 120 and a control unit 124. The switching field 120 is used for switching speech and data and for connecting signalling circuits. The base station system comprising the base station 100 and the base station controller 102 further comprises a transcoder 122. The transcoder 122 is usually located as close to a mobile switching centre 132 as possible since speech can thus be transmitted in the form of cellular radio network between the transcoder 122 and the base station controller 102 by using as little transmission capacity as possible.

The transcoder 122 converts the different digital coding modes of speech used between a public telephone network and a mobile telephone network into compatible ones, for example from the 64 kbit/s form of the fixed network into another form (13 kbit/s, for example), and vice versa. The control unit 124 performs call control, mobility management, collection of statistical data and signalling.

Figure 2:
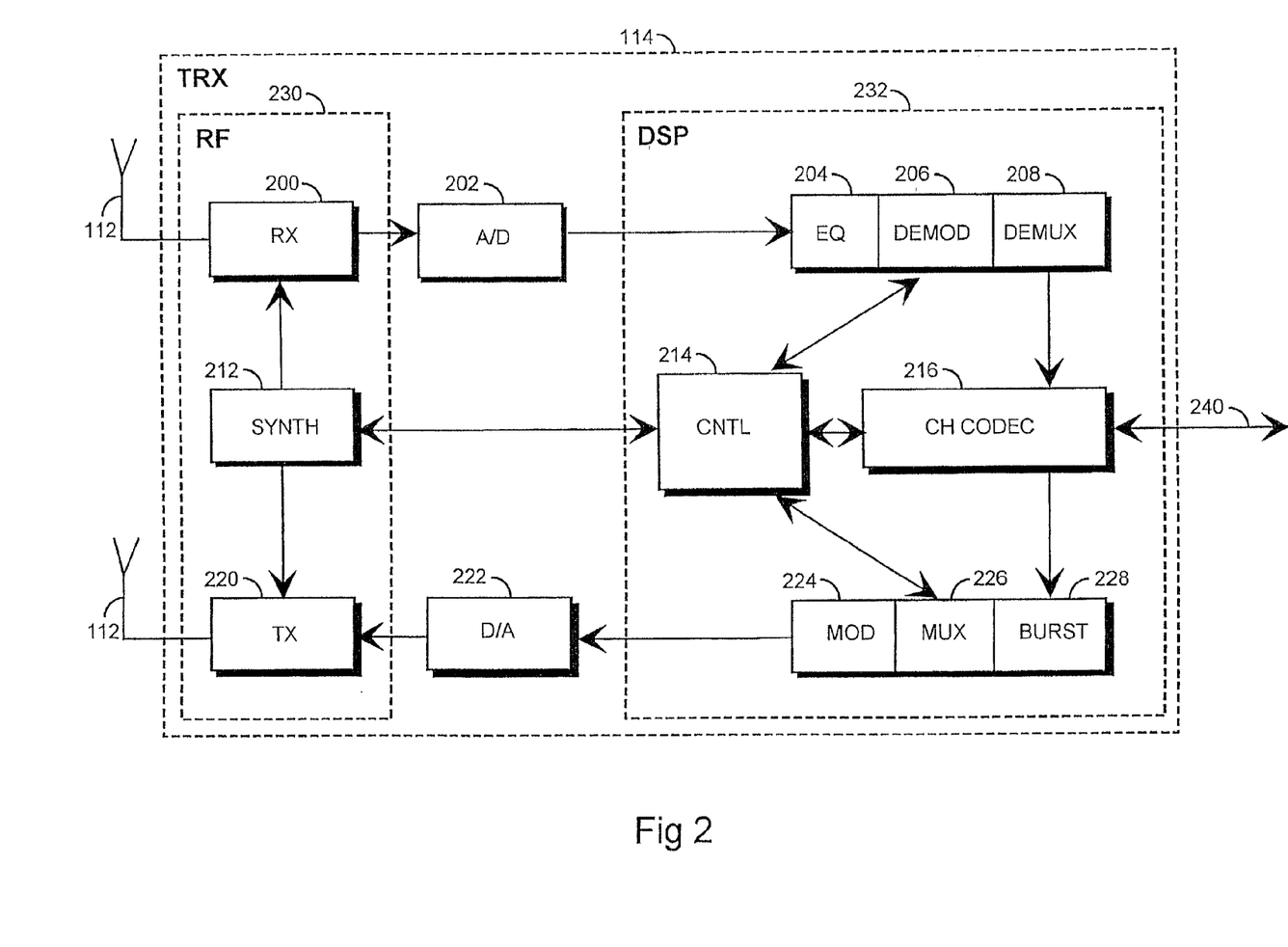
FIG. 2 shows the structure of a transceiver.

FIG. 2 illustrates in greater detail the structure of a transceiver 114. A receiver 200 comprises a filter blocking frequencies outside a desired frequency band. A signal is then converted to an intermediate frequency or directly to baseband, and in this form the signal is sampled and quantized in an analog-to-digital converter 202. An equalizer 204 compensates for interference caused for instance by multi-path propagation. From the equalized signal, a demodulator 206 takes a bit stream, which is transmitted to a demultiplexer 208. The demultiplexer 208 separates the bit stream from different time slots into separate logical channels. A channel codec 216 decodes the bit streams of the separate logical channels, i.e. decides whether a bit stream is signalling data, which is transmitted to a control unit 214, or whether the bit stream is user data, which is transmitted through a bus 240 to be further processed. The channel codec 216 also performs error correction. The control unit 214 performs internal control functions by controlling different units. A burst former 228 adds a training sequence and a tail to the data arriving from the speech codec 216. A multiplexer 226 assigns a time slot to each burst. A modulator 224 modulates digital signals to a radio frequency carrier. This is an analog operation, therefore a digital-to-analog converter 222 is needed for performing it. A transmitter 220 comprises a filter restricting the bandwidth. In addition, the transmitter 220 controls the output power of a transmission. A synthesizer 212 arranges the necessary frequencies for the different units. The synthesizer 212 comprises a clock, which may be locally controlled or which may be controlled in a centralized manner from somewhere else, for example from the base station controller 102. The synthesizer 212 generates the necessary frequencies by using a voltage controlled oscillator, for example.

In a manner shown in FIG. 2, the structure of the transceiver can be further divided into radio frequency parts 230 and a digital signal processor including software 232. The radio frequency parts 230 comprise the receiver 200, transmitter 220 and synthesizer 212. The digital signal processor including the software 232 comprises an equalizer 204, demodulator 206, demultiplexer 208, channel codec 216, control unit 214, burst former 228, multiplexer 226 and modulator 224. The analog-to-digital converter 202 is needed for converting an analog radio signal to a digital signal and, correspondingly, the digital-to-analog converter 222 is needed for converting a digital signal to an analog signal.

The structure of the subscriber terminal 150 can be described by utilizing the description of the structure of the transceiver 114 in FIG. 2. The structural parts of the subscriber terminal 150 are operationally similar to those of the transceiver 114. In addition, the the subscriber terminal 150 comprises a duplex filter between the antenna 112 and the receiver 200/the transmitter 220, user interface parts and a speech codec. The speech codec and the channel codec 216 are connected by the bus 240.

As can be seen from FIG. 1A, the switching field 120 can perform switching (depicted by black dots) both to a public switched telephone network PSTN 134 via the mobile switching centre 132 and to a packet transmission network 142. A typical terminal 136 in the public switched telephone network 134 is a common telephone or an ISDN (Integrated Services Digital Network) telephone.

The connection between the packet transmission network 142 and the switching field 120 is established by a serving GPRS support node SGSN 140. The serving GPRS support node 140 serves to transfer packets between the base station system and a gateway GPRS support node GGSN 144, and to keep a record of the location of the subscriber terminal 150 in its area.

The gateway GPRS support node 144 connects the public packet transmission network 146 and the packet transmission network 142. An Internet protocol or X.25 protocol can be used on the interface. By encapsulation, the gateway GPRS support node 144 hides the internal structure of the packet transmission network 142 from the public packet transmission network 146, so for the public packet transmission network 146 the packet transmission network 142 resembles a sub-network, the public packet transmission network 146 being able to address packets to the subscriber terminal 150 located therein and to receive packets therefrom.

The packet transmission network 142 is typically a private network utilizing an Internet protocol and carrying signalling and tunnelled user data. As regards the architecture and protocols below the Internet protocol layer, the structure of the network 142 may vary operator-specifically.

The public packet transmission network 146 may be the global Internet, for example, to which a terminal 148, a server computer, for example, with a connection thereto wants to transfer packets to the subscriber terminal 150.

Time slots free from the circuit-switched transmission are typically used for packet transfer on the air interface 170. The capacity for the packet transfer is allocated dynamically, i.e. when a data tranmission request arrives, any free channel may be allocated to be used in the packet transfer. The arrangement is flexible in that the circuit-switched connections have priority over the packet-switched connections. If necessary, circuit-switched transmission cancels packet-switched transmission, i.e. the time slot used by the packet-switched transmission will be allocated to the circuit-switched transmission. This is feasible since packet transmission is highly tolerant of such interruptions: the transmission is simply continued by another time slot allocated to be used. The arrangement can also be implemented such that the circuit-switched transmission will not be given any definite priority but both the circuit-switched and the packet-switched transmission requests will be served in order of arrival.

Figure 1B:
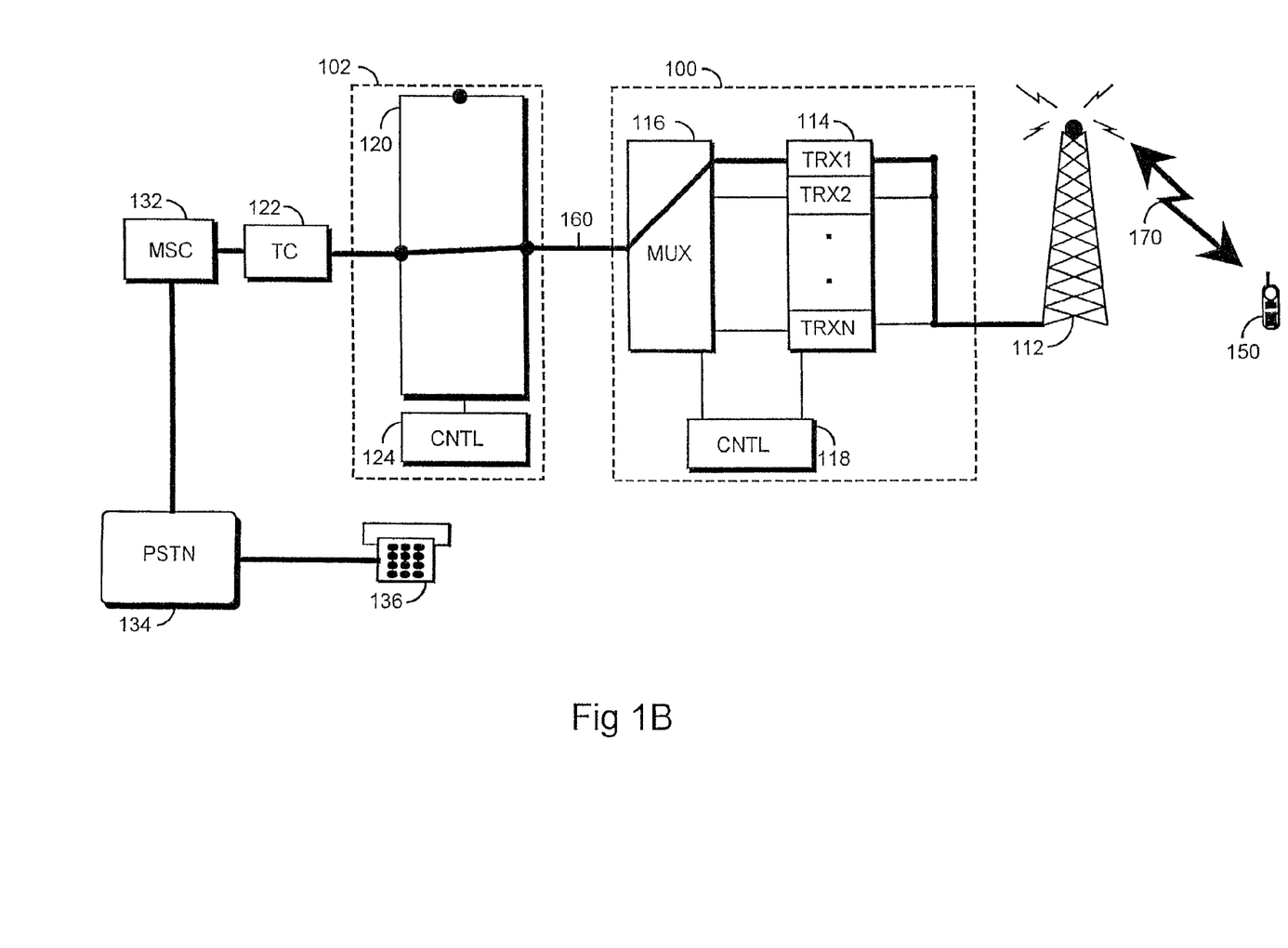
FIG. 1B shows a circuit-switched connection.

FIG. 1B shows how a circuit-switched transmission link is established between the subscriber terminal 150 and the terminal 136 of the public switched telephone network. The bold line in the figures denotes how data travels through the system on the air interface 170, from the antenna 112 to the transceiver 114 and from there, multiplexed at the multiplexer 116, along the transmission link 160 to the switching field 120, where a connection is established to the output heading to the transcoder 122, and from there onwards, through the connection established in the mobile switching centre 132, to the terminal 136 connected to the public switched telephone network 134. At the base station 100, the control unit 118 controls the multiplexer 116 in the transmission, and at the base station controller 102, the control unit 124 controls the switching field 120 to carry out a correct connection.

Figure 1C:
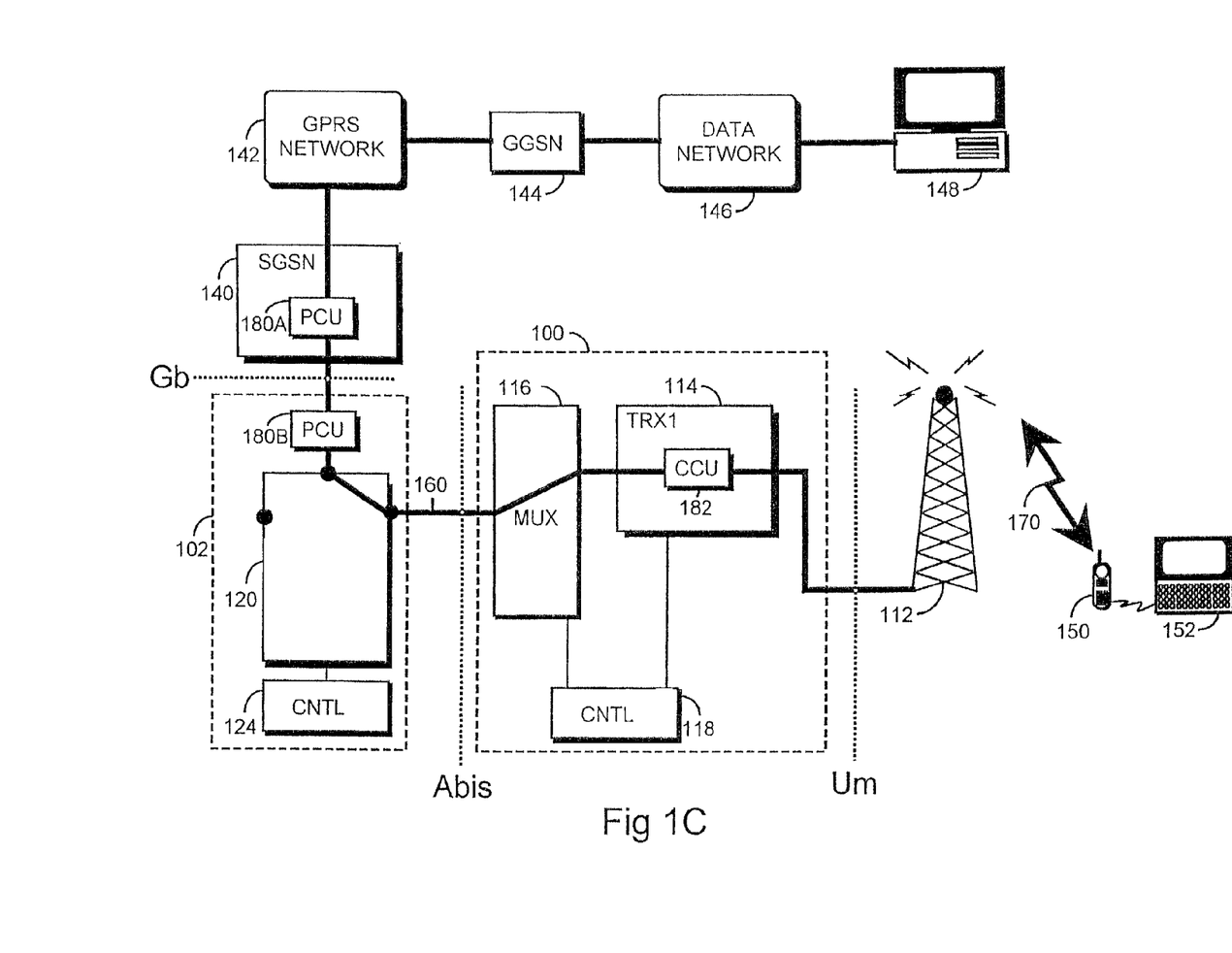
FIG. 1C shows a packet-switched connection.

FIG. 1C shows a packet-switched transmission link. The portable computer 152 is now connected to the subscriber terminal 150. The bold line denotes how data to be transferred travels from the server computer 148 to the portable computer 152. Naturally, data can also be transferred in the opposite direction, i.e. from the portable computer 152 to the server computer 148. Data travels through the system on the air interface, i.e. the Um interface 170, from the antenna 112 to the transceiver 114 and from there, multiplexed in the multiplexer 116, along the transmission link 160 on the Abis interface to the switching field 120, where a connection is established to the output heading to the serving GPRS support node 140 on a Gb interface, from the serving GPRS support node 140 data is supplied along the packet transmission network 142 through the gateway GPRS support node 144, and is connected to the server computer 148 connected to the public packet transmission network 146.

For the sake of clarity, FIGS. 1B and 1C do not describe a case wherein both circuit-switched and packet-switched data is transferred simultaneously. However, this is both feasible and common since the capacity free from circuit-switched data transfer can be flexibly used to implement packet-switched transmission. A network can also be built wherein circuit-switched data is not transferred at all, only packet data. In such a case, the structure of the network can be simplified.

Figure 3:
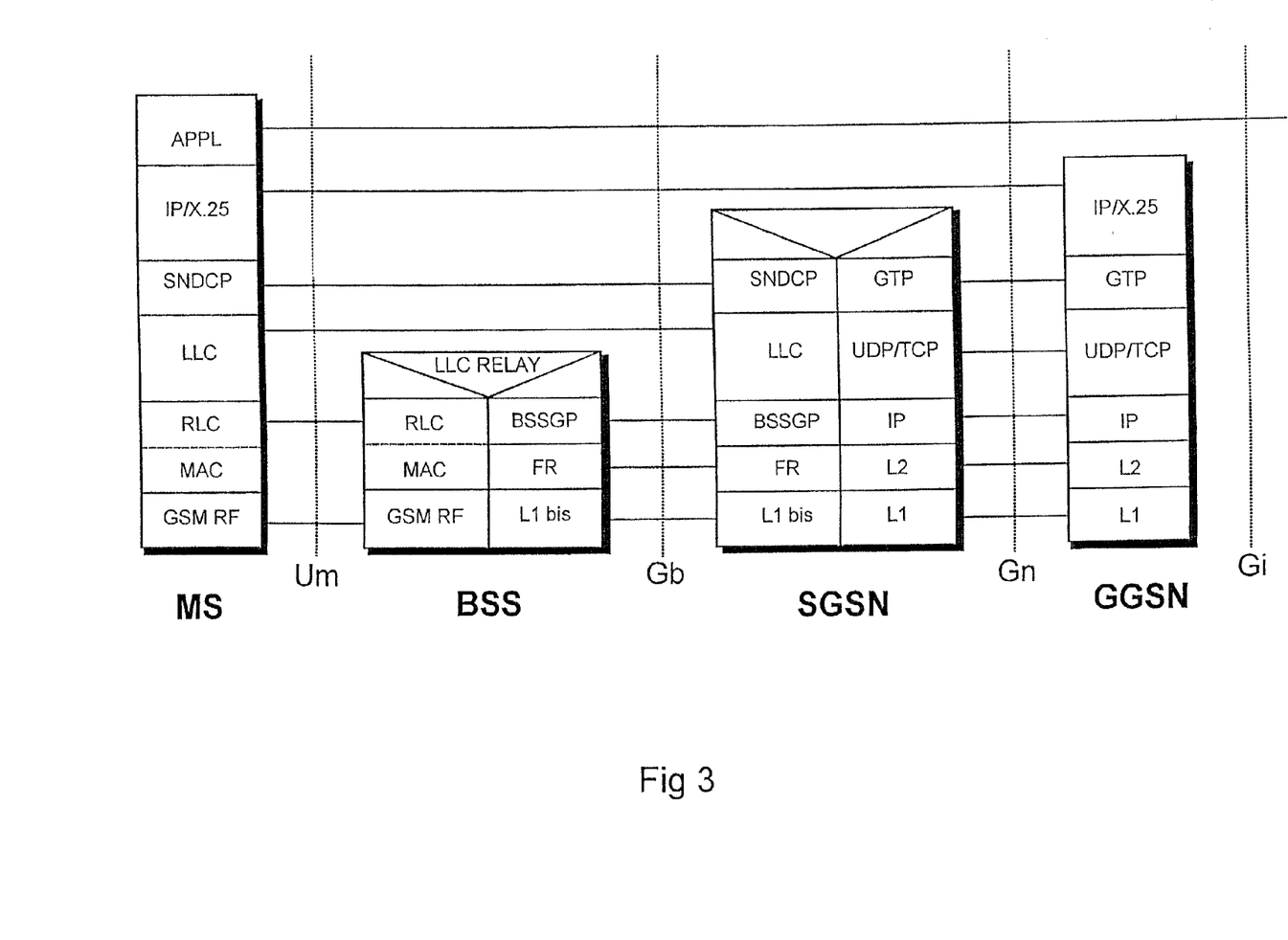
FIG. 3 shows system protocol stacks.

Next, referring to FIG. 3, it will be examined how the protocol stacks used in the system are formed. In a similar manner to that used in the convetional GSM system, the protocol model of the GPRS tramsmission path is also based on an OSI (Open Systems Interconnection) protocol model issued by ISO (International Standardisation Organisation).

As to each network element, FIG. 3 shows which parts of the ptotocol are processed in the network element at issue. The network elements include a mobile station MS, a base station subsystem BSS, a serving GPRS support node SGSN and a gateway GPRS support node GGSN. The base station 100 and the base station controller 102 are not shown as separate units since no interface is specified therebetween as regards protocol processing. The protocol processing specified for the base station subsystem can in principle thus be freely distributed between the base station 100 and the base station controller 102, but not in practice, however, to the transcoder 122 although it is part of the base station subsystem. The different network elements are separated by interfaces Um, Gb, Gn and Gi therebetween.

The highest one of the protocol layers is an application layer APPL. It designates user applications using the GPRS system for data transfer. These applications are often common programs to be used on the Internet, such as e-mail programs and WWW (World Wide Web) browsers.

IP/X.25 offers a connection to the Internet and other external data networks. For the external networks it uses a normal Internet IP protocol.

A GTP (GPRS Tunnelling Protocol) tunnels user data and signalling along the frame network between different GSNs. The GTP can, if desired, implement flow control between the SGSN 140 and the GGSN 144.

A TCP (Transmission Control Protocol) transfers the data packets of the GTP layer along the frame network to the protocols that need a reliable data link when, for example, an X.25 protocol is used. A UDP (User Datagram Protocol), in turn, transfers the data packets of the GTP layer whose protocol does not need a reliable link when, for example, the IP (Internet Protocol) is used. Through the IP, the TCP produces flow control and protection against disappearance and corruption for the packets to be transferred. The UDP correspondingly produces protection against packet corruption only.

The IP is the frame network protocol of the GPRS, the functions of which include routing of user data and control data. The IP can be based on an IPv4 protocol, but an IPv6 protocol will be introduced later.

The most important functions of an SNDCP (Subnetwork Dependent Convergence Protocol) layer include: multiplexing several PDPs (Packet Data Protocol) into one SNDCP connection, compression and decompression of user data and compression and decompression of protocol control information. In addition, the SNDCP segments the data in higher network protocol form into lower LLC (Logical Link Control) layer form, and vice versa.

The LLC layer implements a reliable encrypting logical link between the SGSN 140 and the MS 150. The LLC is independent and does not depend on lower layers so that the air interface change would affect the network part of the mobile network as little as possible. In addition, the LLC supports data frames of varying sizes, transmission of acknowledged and non-acknowledged data and data transfer from the SGSN 140 to several MSs 150 using the same physical radio channel. The LLC allows different priorities for the data such that higher priority data is transferred to the subscriber terminal before lower priority data. The information to be transferred and the user data are protected by encryption. Between the Um and Gb interfaces the LLC data is transferred at an LLC-Relay layer.

In addition to the higher layer data, a BSSGP (Base Station Subsystem GPRS Protocol) layer carries information associated with routing and service quality between the BSS and the SGSN 140. This information is physically delivered by an FR (Frame Relay) layer.

There are two separate functions at the RLC/MAC layer: MAC (Medium Access Control) and RLC (Radio Link Control). The MAC is responsible for performing the following functions: multiplexing data and signalling on uplink (from the subscriber terminal to the network part) and downlink (from the network part to the subscriber terminal) connections, management of uplink resource requests and division and timing of downlink traffic resources. This layer also includes management of traffic prioritization. The RLC attends to the transmission of LLC-layer data, or LLC frames, to the MAC layer; the RLC divides the LLC frames into RLC data blocks and transmits them to the MAC layer. In the uplink direction, the RLC builds LLC frames from RLC data blocks, and transfers them to the LLC layer. On the basis of a BCS (Block Check Sequence) of a CRC (Code Redundancy Check) calculated by the physical level, the RLC layer produces retransmission procedures of erroneous data. The physical level is implemented at the Um interface on the radio connection at, for example, the specified air interface of the GSM. Modulation of the carrier wave, interleaving and error correction on the data to be transmitted, synchronization and transmitter power control are examples of functions performed at the physical level.

Although the examples only show a point-to-point type packet transmission link between two parties, the invention is by no means restricted thereto but it is obvious to one skilled in the art how the described arrangement can also be used on, for example, point-to-multipoint type links wherein one party simultaneously transmits data to several other parties. Neither does the link have to be duplex; the invention enables duplex links but a link may also be a broadcast type link in one direction only wherein the transmitter receives no acknowledgement of the transmission being received from the receiver. Different combinations, e.g. point-to-multipoint broadcast, are also feasible.

Figure 5:
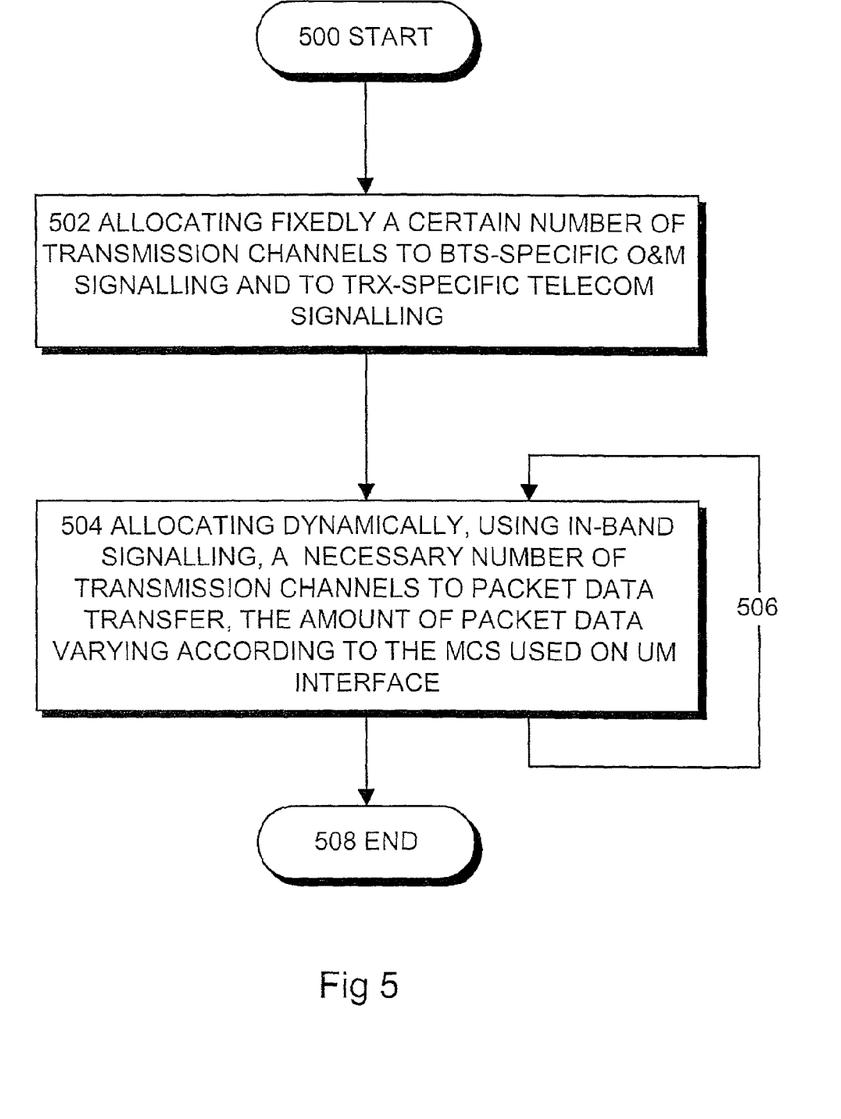
FIG. 5 is a flow diagram illustrating an allocation method of transmission channels.

FIG. 5 shows a method of allocating Abis interface transmission channels in a packet cellular radio network. The process starts at block 500.

In step 502, a certain number of transmission channels is allocated fixedly to base-station-aspecific operations and maintenance signalling and to transceiver-specific telecommunication signalling.

In step 504, using in-band signalling, a necessary number of transmission channels is allocated dynamically to packet data transfer. The amount of packet data varies according to the modulation and coding scheme used on the Um interface, as explained above. Step 504 is a continuous step, which is designated by transition arrow 506 in FIG. 5 according to which step 504 is repeated. Block 508 ending the method will only be entered in special cases, such as while updating the equipment, in which case the process is temporarily interrupted.

Figure 4A:
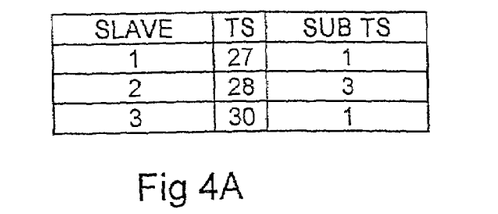
FIG. 4A shows in-band signalling.
Figure 4B:
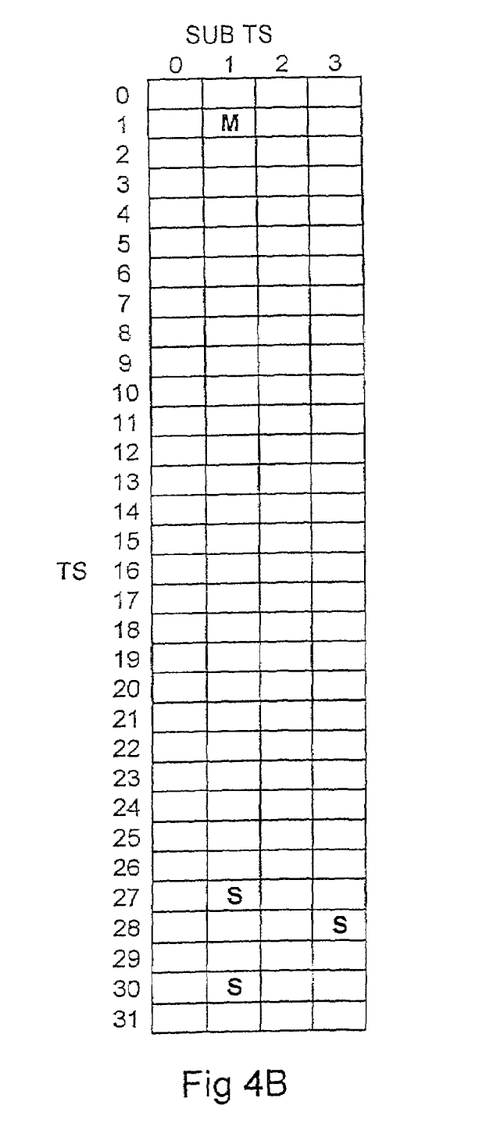
FIG. 4B shows placing of slave channels according to the signalling.

FIGS. 4A and 4B show how the dynamic in-band signalling is carried out. FIG. 4B shows a 32×64 kbit/s data transmission connection typically used on the Abis interface. The vertical axis shows the 64 kbit/s time slots 0 to 31, and the horizontal axis shows how a 64 kbit/s time slot is divided into four sub-timeslots 0 to 3. The sub-timeslot of each time slot forms one transmission channel, which can be allocated separately.

Assume that an MCS requiring a 16 kbit/s transfer rate on the Abis interface is used on the Um interface connection used by the subscriber terminal 150. In such a case, the sub-timeslot of time slot 1 designated by M in FIG. 4B is available for the Um interface connection.

Assume next that the MCS is changed such that instead of the 16 kbit/s transfer rate normally required, a 64 kbit/s transfer rate is now needed. Then, in accordance with the invention, signalling shown in FIG. 4A is placed in the channel designated by M. The signalling is used for dynamically allocating on the Abis interface another three sub-timeslots to be used by the Um interface connection, i.e. sub-timeslot 1 of time slot 27, sub-timeslot 3 of time slot 28, and sub-timeslot 1 of time slot 30. These allocated channels are designated by S in FIG. 4B.

The first transmission channel for transferring packet data is called a master channel, and it comprises information on the number and location of other transmission channels used for transferring packet data, i.e. slave channels. The master channel is allocated by using signalling in the transmission channel reserved for telecommunication signalling, i.e. the signalling is out-band signalling.

The allocation of transmission channels in the disclosed manner may be carried out by applying two principles. According to the first principle, all transmission channels for transferring packet data are allocated entirely dynamically according to the transfer need. According to the second principle, at least one transmission channel is continuously kept allocated to each channel codec unit allocated to Um interface packet data transfer. Many of the Um interface connections may thus alternately and time-divisionally use one channel codec unit of the radio interface. The advantage of the first principle is that the temporary Abis interface capacity can be utilized to the full. The advantage of the second principle is that the slow out-band signalling becomes unnecessary when the first transmission channel is to be allocated to be used by the connection.

Sometimes in packet transfer the data transmission capacity required by the Um interface uplink and downlink is quite different. Consequently, a necessary number of transmission channels is allocated to the uplink and the downlink, unsymmectrically if necessary, i.e. such that the number of transmission channels allocated to different purposes on the uplink and the downlink is different.

On the Abis interface, the time slot information, i.e. radio blocks, is typically placed in TRAU (Transcoder and Rate Adapter Unit) frames formed for transcoding. In circuit-switched speech transfer, 260 bits containing 20 ms of speech are coded at the subscriber terminal 150 such that the most important 50 class Ia bits and 132 class Ib bits are convolution-coded. In addition, error correction bits are added to these bits, which gives a total of 378 bits. Then, 78 class II bits of less importance are added to these 378 bits. This gives a total of 456 bits, which, in principle, would fit in four radio bursts. To be on the safe side, however, the bits will be spread into eight radio bursts in sub-blocks each containing 57 bits. Each burst is transmitted at intervals of 577 microseconds. At the channel codec 216, the speech bits transmitted from eight sequential bursts are collected together. The convolution coding is decoded and the original 260 bits containing speech are placed in a TRAU frame.

Frames whose structure has been optimized may also be used for transferring packet-switched data. A slightly higher transfer rate is then achieved. On the other hand, when standard TRAU frames are used, a better compatibility of the solution of the invention with the existing base station subsystems will be achieved.

A radio block refers to a structure used at the RLC/MAC layer. The radio block comprises carrying of LLC frames and RLC/MAC signalling. The information in one LLC frame is placed in the radio block, each radio block being placed in four normal radio bursts on the radio path 170. The RLC/MAC protocol layer is thus responsible for dividing the LLC frames into smaller blocks so that they can be physically transmitted in the radio blocks over the radio path.

According to the invention, each Abis interface frame, such as the TRAU frame disclosed above, is allocated dynamically according to current data transmission capacity needs of different Um interface connections. The master channel and the slave channel may use a different frame structure optimized for both purposes. An advantage of this embodiment is that the channel data transmission capacity can be maximized.

The packet data to be placed in the channels comprises RLC (Radio Link Control) blocks, each RLC block being distributed to a necessary number of channels. A checksum, such as a CRC (Cyclic Redundancy Check), is formed over the RLC block.

Let us return to FIG. 1C. The network part of the packet cellular radio network thus comprises the base station 100 and the transceiver 114 implementing the Um interface at the base station 100.

In addition to the above, two specific elements are known in the GPRS: a CCU (Channel Codec Unit) and a PCU (Packet Control Unit). The CCU is responsible for channel coding, including FEC (Forward Error Coding) and interleaving, radio channel measurement functions, such as quality level of a received signal, reception power of a received signal, and information relating to measurements of timing advance. The tasks of the PCU include segmenting and re-assembling an LLC frame, ARQ (Automatic Repeat Request) functions, scheduling a PDCH (Packet Data Channel), channel access control and radio channel management functions.

A CCU 182 is located at the base station 100 and, depending on the implementation, it can be regarded as a time-slot-specific or a transceiver-specific unit. A PCU 180A/180B is connected to the CCU 182 through the Abis interface. The PCU may be located in two different places, either at the base station controller 102 or at the serving GPRS support node 140. FIG. 1C shows both alternatives. The location is not, however, relevant to the invention; the essential point is that packet data is transferred on the Abis interface between the PCU and the CCU.

The base station 100 or the base station controller 102, for example, comprises means 118, 124 for allocating fixedly on the Abis interface a certain number of transmission channels to the base-station-specific operations and maintenenace signalling and to the transceiver-specific telecommunication signalling.

According to the invention, the packet control unit 180A/180B dynamically allocates, using in-band signalling, on the Abis interface a necessary number of transmission channels to packet data transfer, the amount of packet data varying according to the modulation and coding scheme used on the Um interface.

The invention is preferably implemented by software, in which case the method of the invention requires relatively simple changes in the software in an accurately specified area in the network part, i.e. in the base station 100 and/or base station controller 102 and in the PCU and the CCU, depending on the implementation. Depending on the responsibilities between the devices, in the network part the means may be divided differently among the control part 118 of the base station 100, the control part of the base station controller 102 and possibly also the serving GPRS support node 140. The means are implemented by software, for example as software to be carried out in a processor. Implemetation by hardware is also feasible, for example as ASIC (Application Integrated Circuit) or as a control logic composed of separate components.

Although the invention has been described above with reference to the example according to the accompanying drawings, it is obvious that the invention is not restricted thereto but can be modified in many ways within the scope of the inventive idea disclosed in the attached claims.

The invention claimed is:

1. A method of allocating Abis interface transmission channels in a packet cellular radio network, comprising:
   allocating fixedly a certain number of transmission channels to base-station-specific operations and maintenance signalling and to transceiver-specific telecommunication signalling;
   further comprising allocating dynamically, using in-band signalling, a necessary number of transmission channels to packet data transfer, the amount of packet data varying according to the modulation and coding scheme used on a Um interface.

2. A method as claimed in claim 1, wherein all transmission channels for transferring packet data are allocated entirely dynamically according to the transfer need.

3. A method as claimed in claim 1, wherein at least one transmission channel is continuously kept allocated to each channel codec unit allocated to Um interface packet data transfer.

4. A method as claimed in claim 1, wherein a necessary number of transmission channels is allocated to the uplink and the downlink such that the number of transmission channels allocated to different purposes on the uplink and the downlink is different.

5. A method as claimed in claim 1, wherein each Abis interface frame is allocated dynamically according to current data transmission capacity needs of different Um interface connections.

6. A method as claimed in claim 1, wherein one transmission channel for transferring packet data is a master channel comprising information on the number and location of other transmission channels, which are slave channels used for transferring packet data.

7. A method as claimed in claim 6, wherein the master channel is allocated by using signalling in the transmission channel reserved for telecommunication signalling.

8. A method as claimed in claim 6, wherein the master channel and the slave channel utilize a different frame structure optimized for both purposes.

9. A network part of a packet cellular radio network, comprising
a base station;
a transceiver implementing a Um interface at the base station;
a channel codec unit at the base station;
a packet control unit communicating with the channel codec unit through an Abis interface;
means for allocating fixedly on the Abis interface a certain number of transmission channels to base-station-specific operations and maintenance signalling and to transceiver-specific telecommunication signalling;
wherein the packet control unit, using in-band signalling, dynamically allocates on the Abis interface a necessary number of transmission channels to packet data transfer, the amount of packet data varying according to the modulation and coding scheme used on the Um interface.

10. A network part as claimed in claim 9, wherein the packet control unit allocates all transmission channels used for transferring packet data entirely dynamically according to the transfer need.

11. A network part as claimed in claim 9, wherein the packet control unit allocates the transmission channels such that at least one transmission channel is continuously kept allocated to each channel codec unit allocated to Um interface packet data transfer.

12. A network part as claimed in claim 9, wherein the packet control unit allocates the transmission channels such that a necessary number of transmission channels is allocated to the uplink and the downlink such that the number of transmission channels allocated to different purposes on the uplink and the downlink is different.

13. A network part as claimed in claim 9, wherein the packet control unit allocates each Abis interface frame dynamically according to current data transmission capacity needs of different Um interface connections.

14. A network part as claimed in claim 9, wherein the packet control unit allocates the transmission channels such that one transmission channel for transferring packet data is a master channel comprising information on the number and location of other transmission channels, which are slave channels used for transferring packet data.

15. A network part as claimed in claim 14, wherein the packet control unit allocates the master channel by using signalling in the transmission channel reserved for telecommunication signalling.

16. A network part as claimed in claim 14, wherein the packet control unit and the channel codec unit use in the master channel and the slave channel a different frame structure optimized for both purposes.

* * * * *